(12) United States Patent
Leonetti

(10) Patent No.: US 6,771,951 B1
(45) Date of Patent: Aug. 3, 2004

(54) METHOD FOR SECURING PERSONAL DATABASE INFORMATION IN CELLULAR AND PERSONAL COMMUNICATION SYSTEMS

(76) Inventor: Joseph A. Leonetti, 1 Wood Ford Ln., Malvern, PA (US) 19355

( * ) Notice: Subject to any disclaimer, the term of this patent is extended or adjusted under 35 U.S.C. 154(b) by 320 days.

(21) Appl. No.: 09/805,614

(22) Filed: Mar. 14, 2001

Related U.S. Application Data

(60) Provisional application No. 60/189,220, filed on Mar. 14, 2000.

(51) Int. Cl.[7] ................................................. H04Q 7/00
(52) U.S. Cl. .................................... 455/414.1; 455/433
(58) Field of Search ............................ 455/414.1, 558, 455/466, 560, 433, 461, 417; 379/211.05, 230, 128, 157

(56) References Cited

U.S. PATENT DOCUMENTS

| | | | | |
|---|---|---|---|---|
| 5,046,082 A | * | 9/1991 | Zicker et al. ................ 455/419 |
| 5,612,682 A | * | 3/1997 | DeLuca et al. ............. 340/5.74 |
| 5,752,188 A | * | 5/1998 | Astrom et al. .............. 455/433 |
| 5,887,250 A | * | 3/1999 | Shah .......................... 455/411 |
| 5,913,165 A | * | 6/1999 | Foti .......................... 455/435.3 |
| 5,915,225 A | * | 6/1999 | Mills ........................... 455/558 |
| 5,933,778 A | * | 8/1999 | Buhrmann et al. .......... 455/461 |
| 6,393,421 B1 | * | 5/2002 | Paglin ............................ 707/9 |
| 6,427,076 B2 | * | 7/2002 | Skog ........................... 455/433 |
| 6,556,842 B1 | * | 4/2003 | Ericsson ..................... 455/558 |
| 6,603,969 B1 | * | 8/2003 | Vuoristo et al. ............. 455/433 |

FOREIGN PATENT DOCUMENTS

WO  WO 02/098146 A2 * 12/2002

* cited by examiner

Primary Examiner—Edward F. Urban
Assistant Examiner—Blane J. Jackson
(74) Attorney, Agent, or Firm—Woodcock Washburn LLP

(57) ABSTRACT

A wireless cellular and personal communication system has a remote personal database storage device that interrogates the personal database information contained within a subscriber's mobile terminal or handset during the initial phase of an outgoing or incoming wireless telephone call to ascertain if there have been changes made to the personal database. The interrogation is an undirected act on the part of the subscriber and is a service provided by the telecommunication service provider. If changes have been made in the personal database in the subscriber's mobile terminal, then the subscriber's entries in the remote personal database storage device are appropriately updated.

3 Claims, 2 Drawing Sheets

METHOD FOR SECURING PERSONAL DATABASE INFORMATION IN CELLULAR AND PERSONAL COMMUNICATION SYSTEMS

CROSS-REFERENCE TO RELATED APPLICATIONS

This Application claims benefit of U.S. Provisional Application Serial No. 60/189,220 filed Mar. 14, 2000, the contents of which are incorporated herein by reference.

FIELD OF THE INVENTION

The present invention relates generally to telecommunications services and methods for securing personal database information, including, but not limited to, called or calling telephone numbers, in wireless cellular telephone and personal communication systems. More specifically, this invention relates to a method for the transfer and securing of such personal database information from the subscriber's mobile terminal or handset to a remote storage device as an undirected act during the operation of a wireless cellular and a personal communication system.

BACKGROUND OF THE INVENTION

The wireless cellular telephone or personal communication system subscriber's mobile terminal or handset has the capability of storing and retrieving the last and frequently called telephone numbers or other personal database information. The failure of the handset device to operate, its loss or theft would cause an inconvenience with the concomitant loss of this personal database information. The possibility of this loss and the limited internal personal database storage capabilities of the handset device has prompted the appearance of personal information management of this data using a personal computer in one implementation (FoneSynCTM, Paragon Software (Developments) Limited, TM 75-554277).

This method requires a wired connection via a cable or a local short-range wireless connection from the handset device to a personal computer and a directed act to initiate the transfer and securing of such information. If such a transfer were not directed to occur, then any personal database information would not be secured. The transfer can be hindered, even if directed to occur, by the out-of-range positioning of the local wireless connection, the process unavailability of the personal computer, or other impediments to the storage of information.

The remote storage of system database information occurs in wireless cellular and personal communication systems. Telecommunication service providers maintain a system database containing information about the users of wireless communication devices to manage the availability of such subscription services as call forwarding, selective call acceptance, and paging alert reminder.

A personal information manager for updating a telecommunication subscriber system database is discussed in U.S. Pat. No. 5,933,778 entitled "Method and Apparatus for Providing Telecommunication Services Based on a Subscriber Profile Updated by a Personal Information Manager." The method described therein to generate a subscriber system database update begins by a directed act of the subscriber in entering schedule data and profile requests into the personal information manager. The stored system database and personal database contain disjoint information as the system database has utility only for the telecommunication service provider.

The transfer of personal voice data from a handset device is discussed in U.S. Pat. No. 5,995,824 entitled "Cellular Phone Voice Recorder". A technique for recording voice to a remote storage device of the telecommunication system using the subscriber's mobile terminal is described. A directed act of the subscriber causes the transfer of the voice recording from the local subscriber mobile terminal or handset to the remote storage device.

Notwithstanding the above mentioned prior art devices, no method is known for securing personal database information from the subscriber's mobile terminal or handset in a wireless cellular and personal communication systems with an undirected act.

SUMMARY OF THE INVENTION

The principal object of the present invention is to secure personal database information in cellular and personal communication systems.

It is also an object of the present invention to secure such personal database information from the subscriber's mobile terminal or handset as an undirected act during the operation of the wireless cellular and personal communication system.

These and other objects are accomplished by the present invention by providing a wireless cellular and personal communication system and a remote personal database storage device. In a preferred embodiment, the personal database information contained within the subscriber's mobile terminal or handset is interrogated during the initial phase of an outgoing or incoming wireless telephone call to ascertain if there have been changes made to the personal database. The interrogation is an undirected act on the part of the subscriber and is a service provided by the telecommunication service provider in one embodiment.

The interrogation is accomplished by techniques well known in the art of database management, including, but not limited to, the technique of a calculated numerical value that uniquely identifies the database information, known as a checksum. The checksum for the personal database contained in the handset is compared with the calculated check sum for the remote personal database.

The comparison of a single check sum can be used in one embodiment to indicate if changes have been made to the entire database. If the indications are that changes have been made, then checksums for the separate parts of the personal database can be calculated and compared to the checksums for the separate parts of the remote personal database. In this manner, an efficient search and determination of what changes have made to a personal database can be ascertained as is well known in the art of database management. The part or parts of the personal database information contained in the subscribers mobile terminal that have been changed are then transmitted to the remote personal database storage device.

The personal database information can be described as, but not limited to, called or calling telephone numbers in wireless cellular telephony; calendars; schedules and appointments; Universal Resource Locators (URL) for the Internet which includes both the applicable data protocol and the domain name or Internet Protocol (IP) address; sections of remote databases to which the subscribers have access and authority, such as, but not limited to, financial and stock transactions and travel and lodging reservations; process control and automation information, such as, but not limited to, home and office security access and alarms and environmental controls; voice; text; and numerical paging messages.

BRIEF DESCRIPTION OF THE DRAWINGS

The above and other features and advantages of the invention will be more apparent from the following detailed description of the invention, of which.

DETAILED DESCRIPTION OF THE INVENTION

Figure 1:
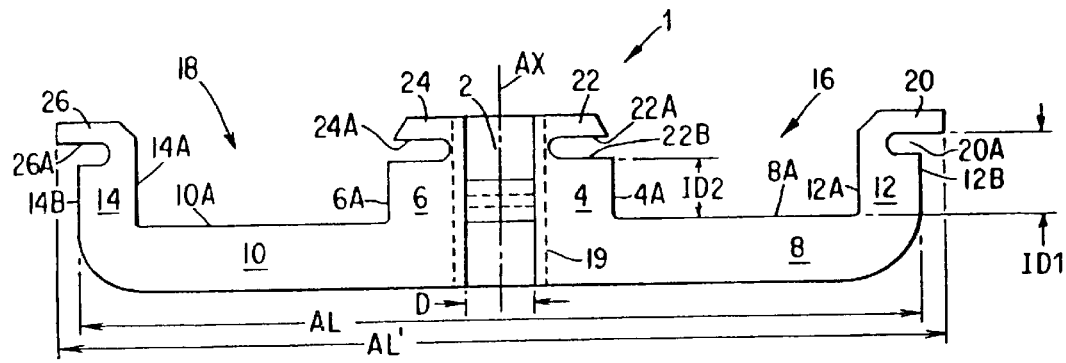
FIG. 1 is a sample embodiment for securing personal database information as an undirected act in a cellular and personal communication network of the present invention.

A detailed description of a presently preferred embodiment of a system and method for securing personal database information as an undirected act in a cellular and personal communication network is described with particular reference to FIGS. 1 band 2. However, it should be understood that the illustrated embodiment provides only a sample of the many innovative teachings and advantageous uses of the present invention and do not delimit the invention set forth in the claims.

One embodiment for securing personal database information as an undirected act in a wireless cellular and personal communication network is shown in FIG. 1. As illustrated, a wireless cellular and personal communication network 102 includes a mobile services center (MSC) 104, a radio base station (RBS) 106, and a personal database center (PDC) 108. A subscriber's mobile terminal 110 is shown in communication with the RBS 106 via a radio communication link 112.

The cellular wireless and personal communication network 102 and the subscriber's mobile terminal 110 shown here are operating in accordance with *TIA/EIA Interim Standard IS*-136, *IS*-95, or *UWC*-136 standard of the Telecommunications Industry Association, the European Telecommunication Standards Institute *Global System for Mobile Communication* (GSM) standard, or other applicable standards. These standards are well known in the art of wireless cellular communication as described in Vijay K. Garg and Joseph E. Wilkes, *Wireless and Personal Communication Systems*, Prentice Hall Publishing, Upper Saddle River, N.J., 1996, and incorporated by reference herein. Those skilled in the art will appreciated that the subscriber' mobile terminal 110 may be embodied as a personal digital assistant (PDA) or other wireless cellular terminal or telephone device.

The MSC 104 is in database communication with the visitor location register (VLR) 114 and the home location register (HLR) 116. The VLR 114 is a subscriber system database containing information about the subscriber's mobile terminals located with the MSC 104 and the VLR-control area. The HLR 116 is a subscriber system database containing subscriber profiles, current location information, and other system administration information. The HLR 116 can be located at a given MSC 104 or can be associated with multiple MSCs 104.

The PDC 108 can be located at a given MSC 104 or can be associated with multiple MSCs 104. The PDC 108 contains a personal database (PD) 118 that contains the storage of the personal database information. The functioning of the PDC 108 is controlled by the personal database center logic (PDC logic) 120.

The PD 118 may be any computer processor or logic writeable and readable storage device. The PD 118 may be without limitation an electronically erasable programmable memory device (for example, an EEPROM), a magnetic storage device (for example, a magnetic disk) or an optical storage device. The PDC logic 120 may be a stored program computer processor executing instructions in the manner well known in the art. The PDC logic 120 may also be circuitry for executing the PDC logic 120 functions.

Figure 2:
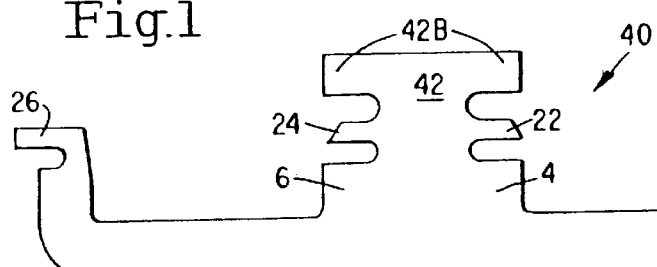
FIG. 2 is the structure of a personal database record.
Figure 3:
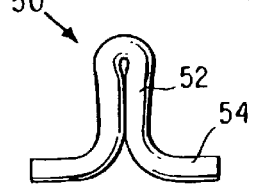
Figure 7:
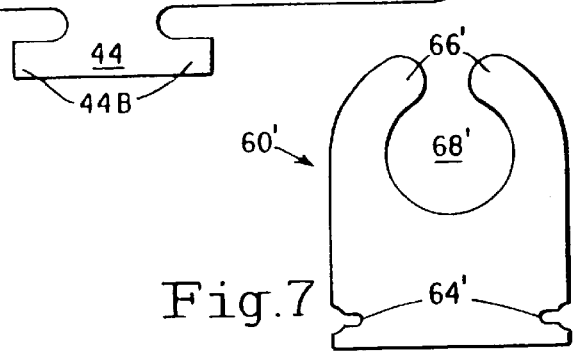
Figure 4:
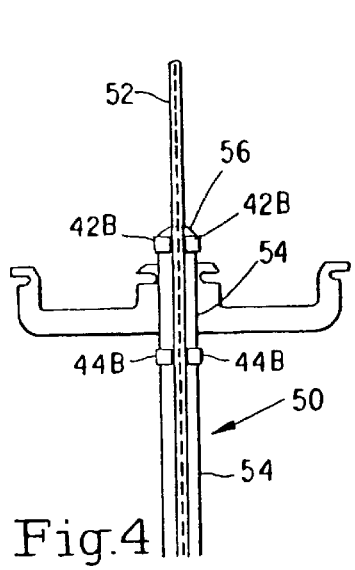
Figure 5:
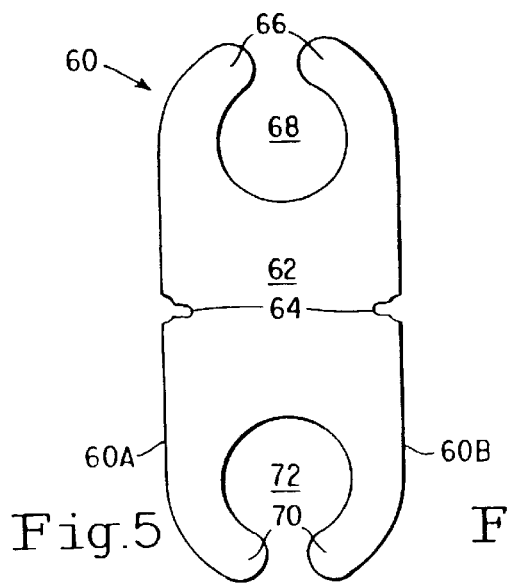
Figure 6:
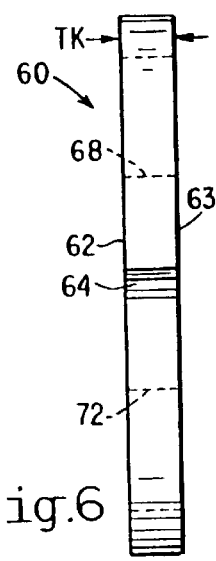
Figure 8:
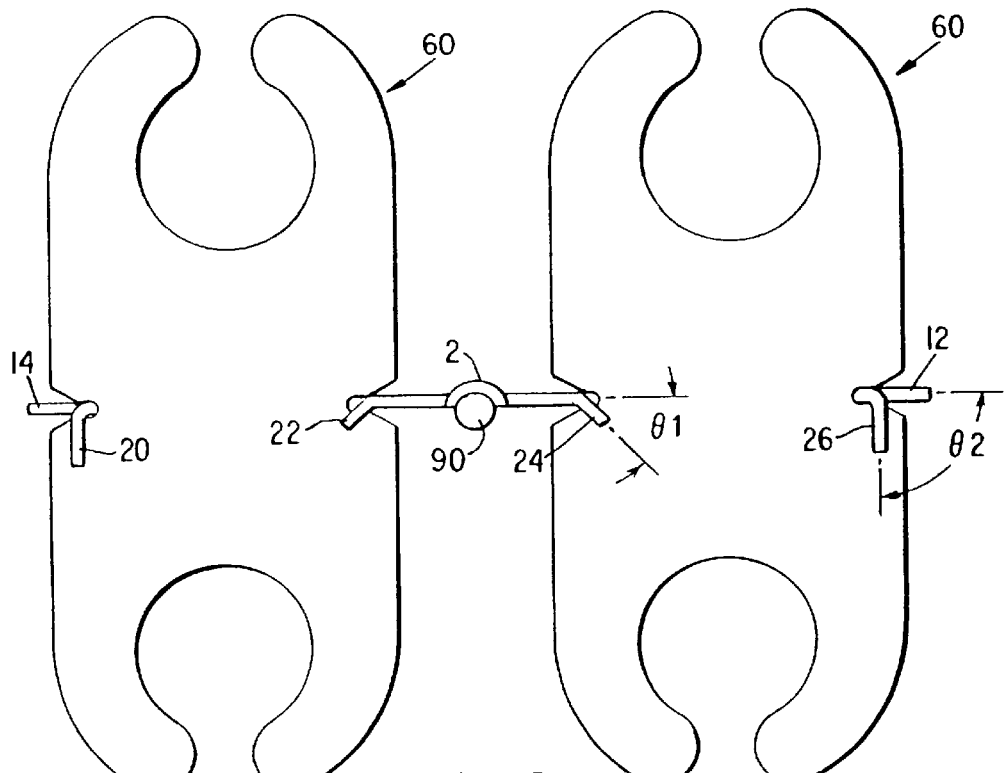
Figure 9:
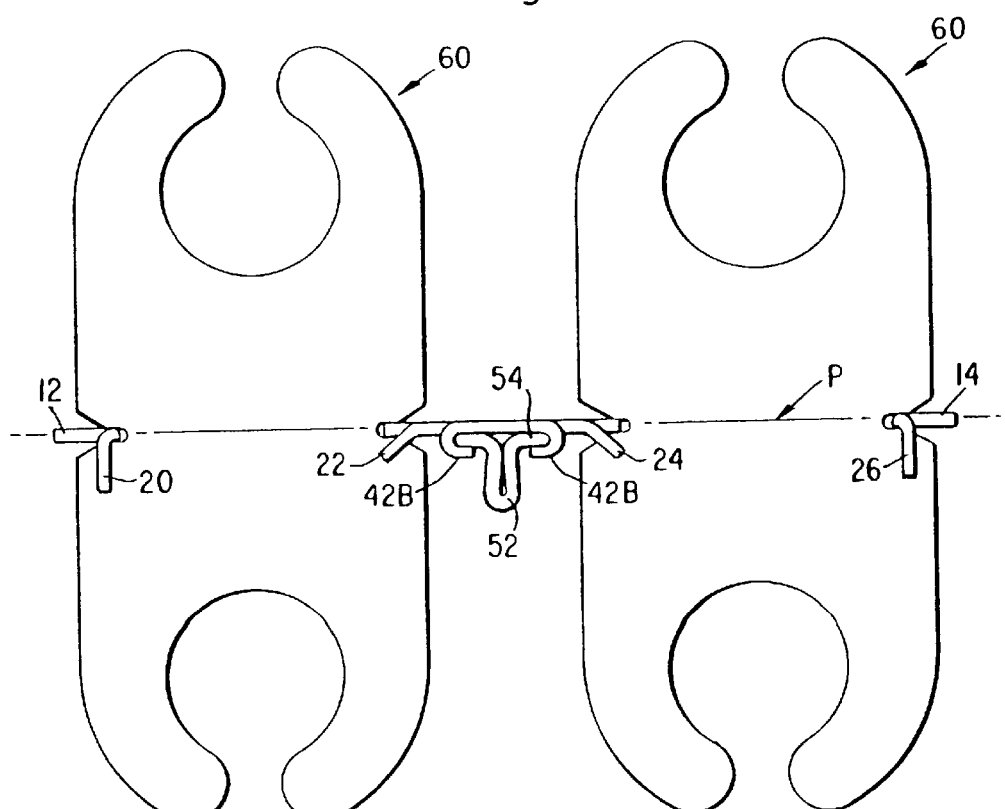
Figure 1:
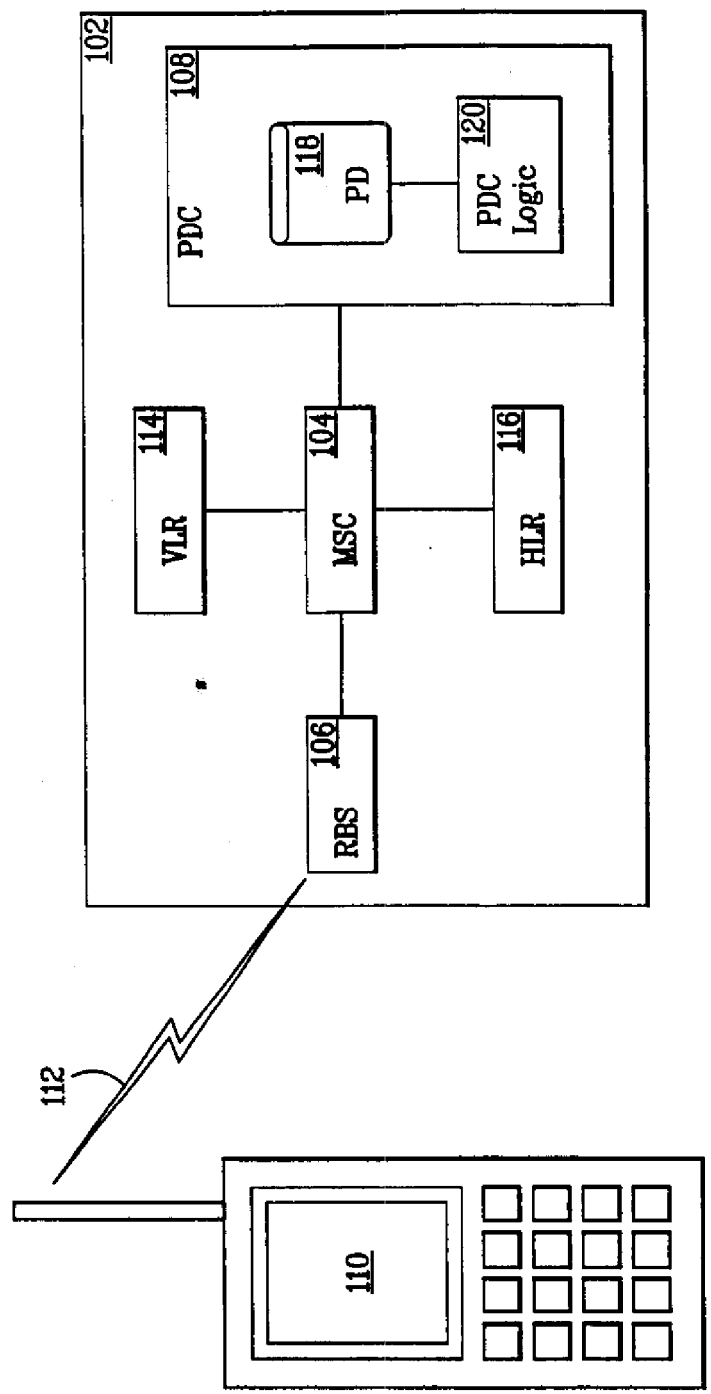
Figure 2:
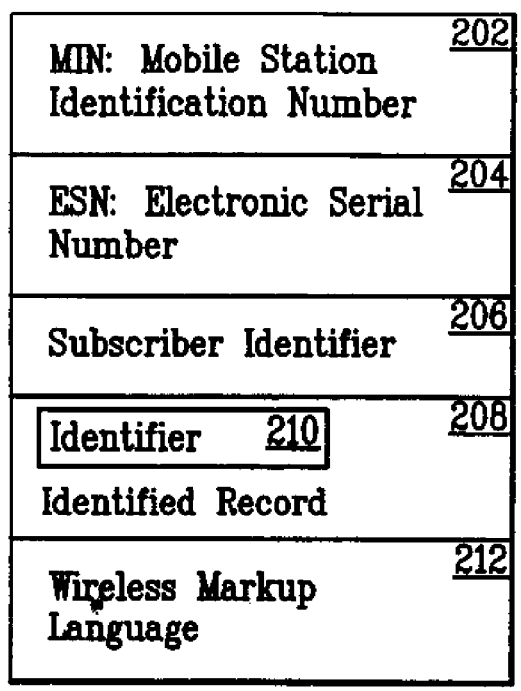

The PD 118 is the subscriber personal database that is transferred and updated from the subscriber's mobile terminal 110 as an undirected act during the operation of the cellular wireless and personal communication network 102. The personal database structure 200 of the PD 118 in one sample embodiment is shown in FIG. 2. The initial entries in the PD 118 are to identify the subscriber and in a presently preferred embodiment include the mobile station identification number (MIN) 202, the electronic serial number (ESN) 204 of the subscriber's mobile terminal 110, and any other ancillary subscriber identifier 206 indicated by the requirements of the cellular wireless and personal communication network 102.

The PD 118 is the storage for personal database information that can in one embodiment be organized as identified records IR 208. The IR 208 contains an identifier 210 that indicates the type of standard database record that contains the information as is well known in the art. Another embodiment of the personal database information of the PD 118 is a representation of an extensible hypertext Markup Language (@L) syntax called the Wireless Markup Language (WML) 212. WML is defined as a Wireless Application Protocol (WAP) accessed by a wireless cellular telephone and personal communication system using standard Internet protocols as defined an industry consortium headed by Unwired Planet, Inc., Redwood City, Calif.

The subscriber mobile terminal 110 is used for the exchange of subscriber information that may include voice, data, or a combination of voice and data in wireless cellular and personal communication network 102. The exchange of subscriber information has as a prerequisite the establishment of a wireless telecommunication connection requiring the exchange of system information well known in the art.

As part of this exchange of system information, an interrogation request is transmitted from the MSC 104 via the RBS 106 and the radio communication link 112 to the subscriber's mobile terminal 110. One sample embodiment of this interrogation request would be as an unstructured supplementary service data (USSD) message in the GSM telecommunication protocol. Another sample embodiment of this interrogation request would be as part of the WAP standard.

The interrogation request initiates the process of ascertaining the correspondence of the personal information database in the subscriber's mobile terminal 110 and the PD 118 contained within the PDC 108. One sample embodiment of the process is the technique of calculated numerical values that uniquely identify the database information known as a checksum and well known in the art of database management. The checksum for the personal database contained in the subscriber mobile terminal 110 is compared with the calculated checksum for the PD 118 contained within the PDC 108.

The comparison of single checksums can be used in one embodiment to indicate if changes have been made to the entire database. If the indications are that changes have been made, then checksums for the separate parts of the personal database can be calculated and compared to the checksums for the separate parts of the remote personal database. In this manner, an efficient search and determination of what changes have made to a personal database can be ascertained as described in the following teachings and others well known in the art of database management.

U.S. Pat. No. 5,649,089 entitled "Method and Apparatus for Maintain a Redundant Database System" teaches a method of insuring that an active database, such as that embodied in the subscriber's mobile terminal 110, and a secondary database, such as the PD 118 contained within the PDC 108, are concurrent. The checksum of a modified database record is incorporated into a virtual checksum for the entire active database. The modified record and the active database virtual checksum is communicated to the secondary database. The secondary database record is modified and a virtual checksum for the entire secondary database is calculated to ensure that the secondary database mirrors the active database.

U.S. Pat. No. 5,974,574 entitled "Method of Comparing Replicated Databases Using Checksum Information" teaches another method of performing a check or comparison of a replicated database in a rapid, efficient, and trusted manner. A position sensitive checksum is calculated for each entry of the database and for each modification of a database entry. The position checksum value for the modified database entry and for the entry before modification for the personal database contained in the subscriber mobile terminal 110 are exclusive ORed with the same checksum values for the PD 118 to ensure that the modification was properly made and that the replicated databases remains credible.

U.S. Pat. No. 5,996,113 entitled "Method and Apparatus for Generating Digital Checksum Signatures for Alteration Detection and Version Confirmation" teaches a method for generating a digital checksum signature for a database. An improved digital checksum signature is calculated which is difficult to render inaccurate or subject to malicious interference. The digital checksum signature can identify the current version of a database or when changes have been made to a database in a secure manner.

U.S. Pat. No. 5,912,909 entitled "Method and Apparatus for Efficient Implementation of Checksum Calculations" teaches a method for improved efficiency in the calculation of a checksum. The improved and efficient calculation of a checksum embodies the method required for the secure transfer of personal database information.

In accordance with the invention, such systems are improved upon in that the interrogation request and the subsequent securing of the personal database information is an act that is undirected by the subscriber and occurs during the operation of the wireless cellular and personal communication network. As will be recognized by those skilled in the art, the teachings of the present invention should not be limited to the specific sample embodiments discussed but instead limited to the scope of the claims set forth below.

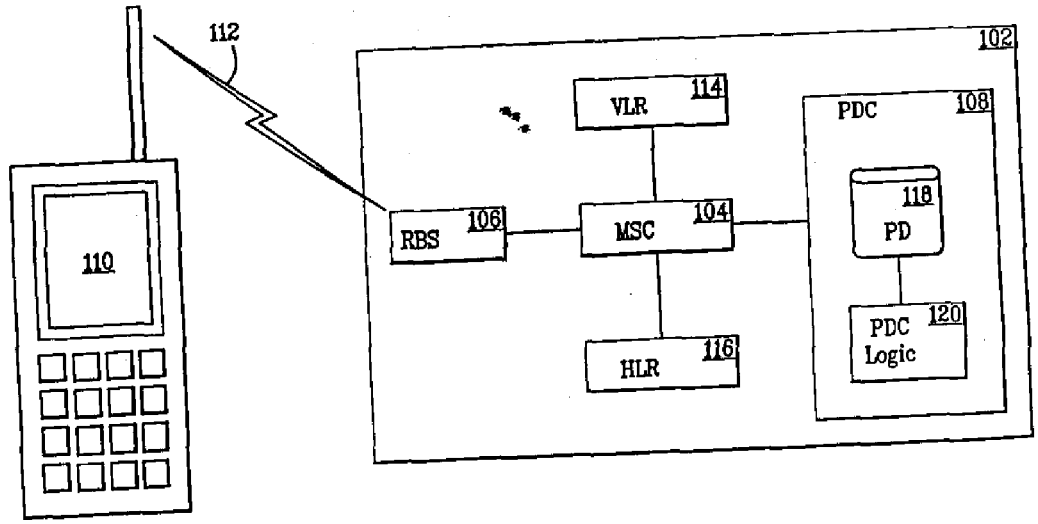

I claim:

1. A system for securing personal database information in a wireless cellular telephone and personal communication system as an undirected act during operation, comprising:

a personal database center associated with a wireless cellular telephone service center, the personal database center containing a secure storage unit that stores a subscriber's personal data, a logic circuit that retrieves the subscriber's stored personal data, and a transceiver that sends interrogation requests to at least one subscriber mobile terminal; and a subscriber mobile terminal responsive to said interrogation requests from the personal database center so as to send personal database information stored in the subscriber mobile terminal to the personal database center for storage, wherein the personal database information stored in the subscriber mobile terminal is interrogated by the personal database center during an initial phase of an outgoing or incoming wireless telephone call to ascertain if there have been any changes to any entries in the personal database information.

2. The system of claim 1, wherein the subscriber mobile terminal determines if there have been any changes to any entries in the personal database information by comparing a checksum for the personal database information stored in the subscriber remote terminal with a checksum for entries for the subscriber's stored personal data in the personal database center.

3. The system of claim 1, wherein the interrogation request is an unstructured supplementary service data message in the GSM telecommunication protocol.

* * * * *

UNITED STATES PATENT AND TRADEMARK OFFICE
CERTIFICATE OF CORRECTION

PATENT NO. : 6,771,951 B1
DATED : August 3, 2004
INVENTOR(S) : Joseph A. Leonetti It is certified that error appears in the above-identified patent and that said Letters Patent is hereby corrected as shown below:

Title page,
Item [56], References Cited, U.S. PATENT DOCUMENTS, insert
-- 5,649,089   7/1997       Kilner           395/182.04
   5,912,909   6/1999       McCoy            371/53
   5,974,574   10/1999      Lennie et al.    714/52
   5,995,824   11/1999      Whitfield        455/412
   5,996,113   11/1999      Korn et al.      714/807 --
OTHER PUBLICATIONS, insert
-- Garg, V.K. et al., Wireless and Personal Communication Systems, 1996, Prentice Hall Publishing --

Drawings,
Please replace Figures 1-9 with attached replacement sheets for Figures 1 and 2.

Column 3,
Line 17, please delete "band" and insert -- and -- therefor.
Line 43, please delete "appreciated" and insert -- appreciate -- therefor.
Line 43, please delete "subscriber' " and insert -- subscriber's -- therefor.

Column 4,
Line 30, please delete "as defined an" and insert -- as defined in -- therefor.

Signed and Sealed this

Twenty-sixth Day of July, 2005

JON W. DUDAS
*Director of the United States Patent and Trademark Office*

(12) United States Patent
Leonetti

(10) Patent No.: US 6,771,951 B1
(45) Date of Patent: Aug. 3, 2004

(54) METHOD FOR SECURING PERSONAL DATABASE INFORMATION IN CELLULAR AND PERSONAL COMMUNICATION SYSTEMS

(76) Inventor: Joseph A. Leonetti, 1 Wood Ford Ln., Malvern, PA (US) 19355

( * ) Notice: Subject to any disclaimer, the term of this patent is extended or adjusted under 35 U.S.C. 154(b) by 320 days.

(21) Appl. No.: 09/805,614

(22) Filed: Mar. 14, 2001

Related U.S. Application Data

(60) Provisional application No. 60/189,220, filed on Mar. 14, 2000.

(51) Int. Cl.$^7$ .................................................. H04Q 7/00
(52) U.S. Cl. ............................. 455/414.1; 455/433
(58) Field of Search ........................... 455/414.1, 558, 455/466, 560, 433, 461, 417; 379/211.05, 230, 128, 157

(56) References Cited

U.S. PATENT DOCUMENTS

| | | | | |
|---|---|---|---|---|
| 5,046,082 A | * | 9/1991 | Zicker et al. | 455/419 |
| 5,612,682 A | * | 3/1997 | DeLuca et al. | 340/5.74 |
| 5,752,188 A | * | 5/1998 | Astrom et al. | 455/433 |
| 5,887,250 A | * | 3/1999 | Shah | 455/411 |
| 5,913,165 A | * | 6/1999 | Foti | 455/435.3 |
| 5,915,225 A | * | 6/1999 | Mills | 455/558 |
| 5,933,778 A | * | 8/1999 | Buhrmann et al. | 455/461 |
| 6,393,421 B1 | * | 5/2002 | Paglin | 707/9 |
| 6,427,076 B2 | * | 7/2002 | Skog | 455/433 |
| 6,556,842 B1 | * | 4/2003 | Ericsson | 455/558 |
| 6,603,969 B1 | * | 8/2003 | Vuoristo et al. | 455/433 |

FOREIGN PATENT DOCUMENTS

WO  WO 02/098146 A2 * 12/2002

* cited by examiner

Primary Examiner—Edward F. Urban
Assistant Examiner—Blane J. Jackson
(74) Attorney, Agent, or Firm—Woodcock Washburn LLP

(57) ABSTRACT

A wireless cellular and personal communication system has a remote personal database storage device that interrogates the personal database information contained within a subscriber's mobile terminal or handset during the initial phase of an outgoing or incoming wireless telephone call to ascertain if there have been changes made to the personal database. The interrogation is an undirected act on the part of the subscriber and is a service provided by the telecommunication service provider. If changes have been made in the personal database in the subscriber's mobile terminal, then the subscriber's entries in the remote personal database storage device are appropriately updated.

3 Claims, 2 Drawing Sheets